Feb. 26, 1935.   D. W. NORWOOD   1,992,233
ART OF PHOTOGRAPHY
Filed Aug. 21, 1933   2 Sheets-Sheet 2
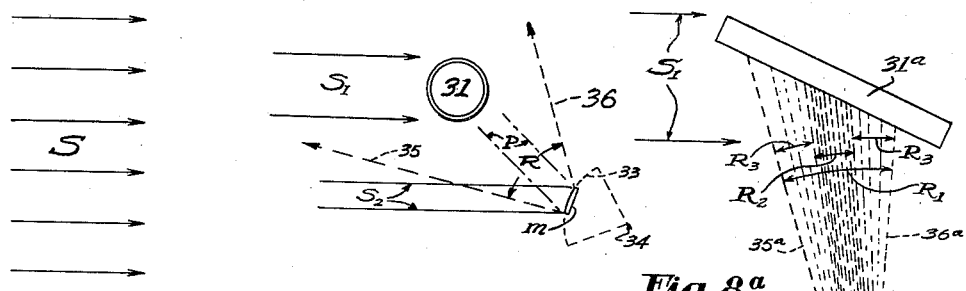
Fig. 8.   Fig. 8ᵃ.
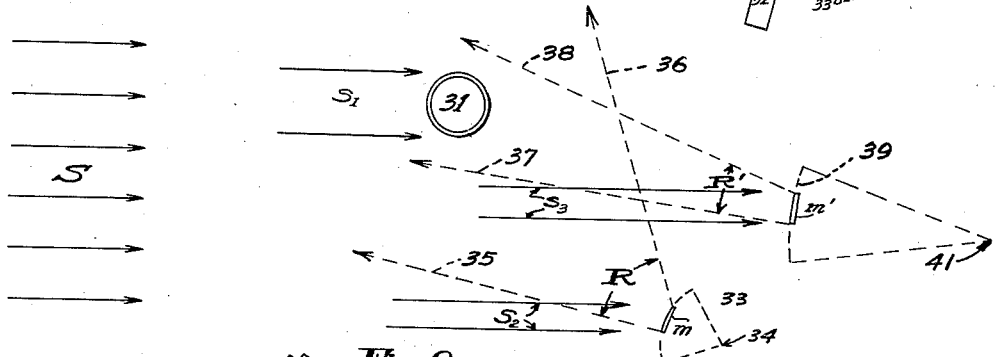
Fig. 9.
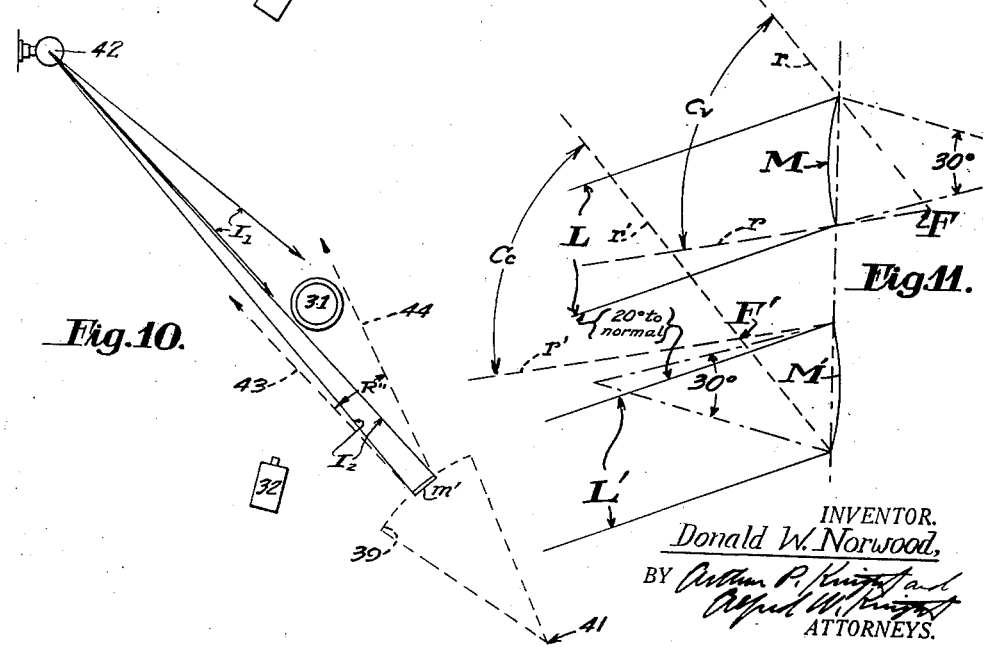
Fig. 10.   Fig. 11.
INVENTOR.
Donald W. Norwood,
BY
ATTORNEYS.

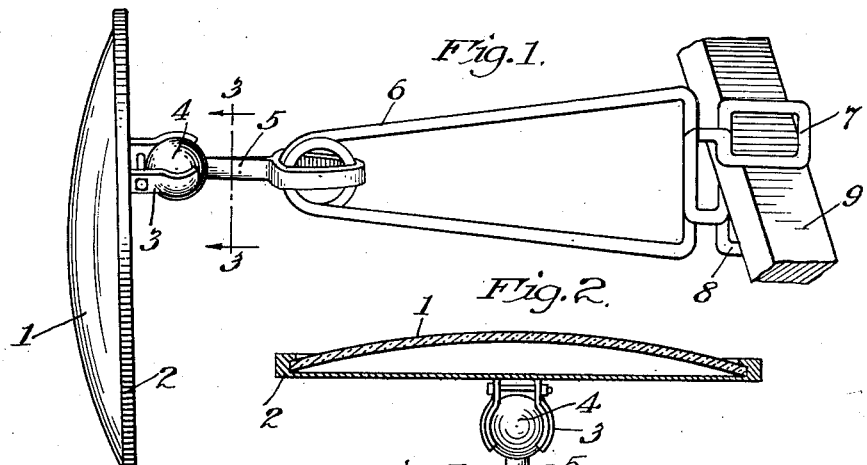
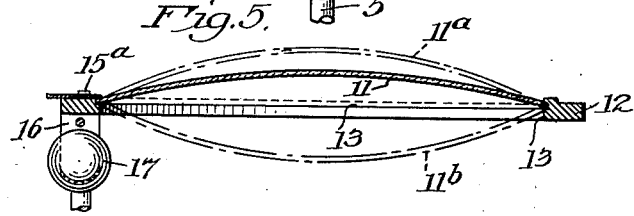
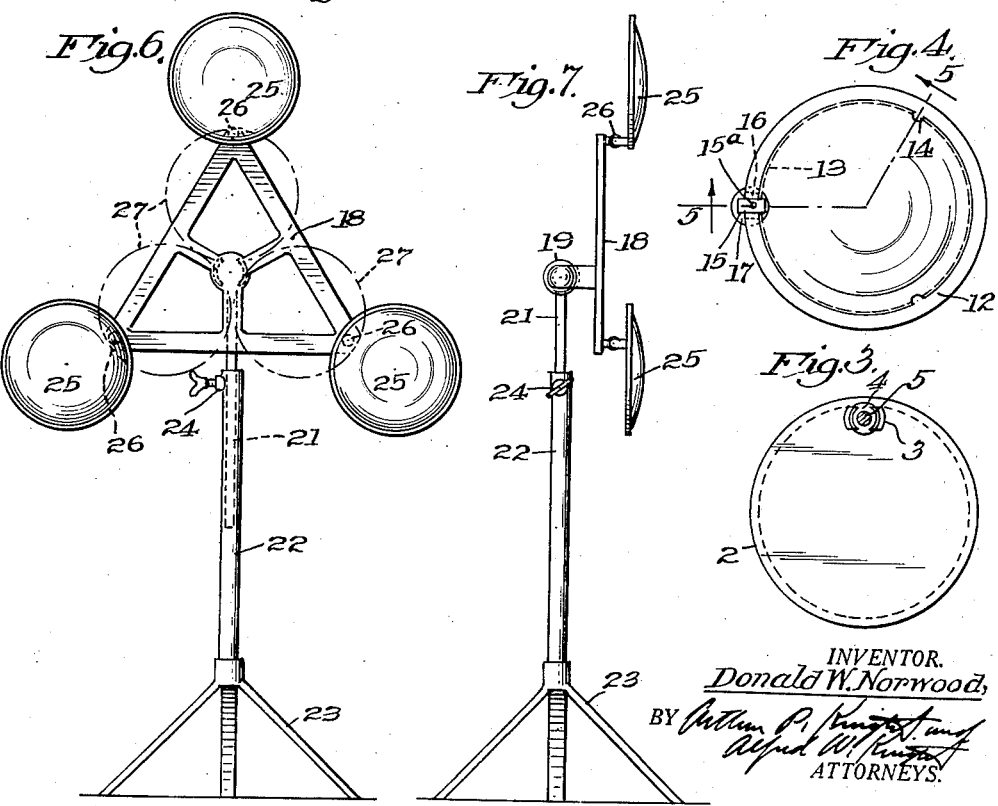

UNITED STATES PATENT OFFICE 1,992,233

ART OF PHOTOGRAPHY

Donald W. Norwood, Randolph Field, Tex.

Application August 21, 1933, Serial No. 676,103

11 Claims. (Cl. 95—82)

This invention relates to the art of photography and particularly to an improved means and method for illuminating a photographic subject.

The present invention is directed particularly to an improvement in amateur motion picture and "still" photography, but it will be appreciated that it is equally adapted to professional motion picture and "still" photography. Certain parts of the following description will pertain particularly to amateur photography for the reason that in this field the advantages of the present invention are most fully attained.

It may be said that the principal proportion of amateur photography and a considerable proportion of professional photography is carried out with sunlight as the source of illumination for the photographic subject, and it is well known that the lights and shadows produced in this manner are quite contrasting unless a certain amount of side illumination which illuminates the subject from an angle differing from the angle of the sun rays is attained, in order that these shadows may be somewhat illuminated and the contrast thereby reduced. In order to obtain a more uniform illumination of a subject it is common practice in professional photography to employ suitable reflectors for obtaining a diffuse reflection of the sunlight upon the shadowed surfaces of the subject. The reflecting apparatus used by professional photographers is ordinarily quite bulky for the reason that it is necessary to obtain a relatively large area of quite diffuse illumination. Under some conditions and in some circumstances, artificial illumination is often employed, for decreasing the contrast in the illuminated subject, as by means of flood lights, spot lights or the like.

In amateur photography it is not feasible to carry about a large quantity of bulky reflecting apparatus or artificial illuminating means, and hence, heretofore, amateur photographers have had to content themselves with the illumination at hand and have had to limit their photographic activities to conditions such that the desired illumination is obtained without reflected or auxiliary artificial light. In many cases, it is absolutely impossible to obtain the desired illuminating effects by direct sunlight, or by a single source of artificial light, and the field of amateur photography has therefore been seriously restricted. As a specific example, numerous very striking effects may be obtained by so-called "back" lighting, such as by having the principal illumination fall on the rearward side of a photographic subject, but in this case, the illumination of the forward or camera side of the subject is comparatively low, and it is necessary to provide some means of secondary illumination therefor in order to obtain a suitable photographic register. Even in professional photography, certain situations arise in which the source or character of illumination is not suitable for good photography, particularly in news photography, and while it is possible to use "photo-flash lamps" or flashlight exposures for "still" photography to assist or modify the existing illuminating facilities, such assistance may not be had for motion picture photography, and a news-reel photographer may not carry about or use any bulky reflecting apparatus. Thus the present invention is of particular advantage in that a very portable device may be utilized to produce the necessary secondary illumination.

The use of small reflecting surfaces having a relatively high reflecting power and a relatively low diffusing power, such as tin or aluminum-foil reflectors, has not met with any particular success due to the fact that the area of illumination obtained is rather small and frequently not sufficiently uniformly diffusing to produce a secondary illumination which is free of secondary highlights and shadows. If a plane reflecting surface small enough to be easily portable, such as a plane mirror, is employed, the area which may be illuminated thereby is relatively small as compared with the usual dimensions of the subjects to be illuminated and the illumination itself is more intense than is required. I have found that side or secondary illumination may be advantageously obtained by reflection from a curved mirror, that is, from a curved nearly perfect or highly reflecting surface. Such a mirror may be employed to reflect sunlight or other primary illumination onto a subject in a divergent beam, which makes it possible for a relatively small reflecting surface to be used to illuminate a relatively large photographic subject at an intensity considerably lower than the intensity of the primary illumination, yet at an intensity sufficient to suitably diminish the contrast of the illuminated subject. For example a person's face may be photographed with full sunlight falling onto the person's left, and a curved reflecting surface disposed a short distance to the person's right in the full beam of the sunlight and adapted to reflect a cone of illumination sufficient to cover the photographic field and at an angle of, for example 90° or more to the direction of the sunlight. If the subject to be illuminated is quite small, such as a person's face, the curved reflector may be placed quite close, in which case the illumination will be fairly intense and the area covered thereby will be quite small, or the same reflector may be moved to a greater distance and the intensity of secondary illumination reduced and the area of illumination correspondingly increased. The intensity and area of secondary illumination may also be varied by using reflectors of different curvatures, as hereinafter set forth. If it is desired to use two or more secondary illuminators, a suitable number of curved reflecting surfaces may be disposed at suitable angles with respect to the subject, and placed at differing distances therefrom so that the desired intensity and area of the several angles of illumination are adjusted to suit the photographic requirements.

As another example a mirror of relatively slight curvature may be employed to secondarily illuminate but a portion of the photographic subject or to "super-illuminate" such a portion. For example, where a group of individuals or objects are in the photographic field, a single individual or object may be made to stand out over the other individuals or objects by accentuating the illumination on such individual or object, after the procedure employed in "still" photography through the use of a spot-light or the like. Were a plane mirror to be used for this purpose it would be necessary that the mirror be of substantially the exact size of the area to be super-illuminated and the outer boundaries of the spot of illumination would be very abrupt, while by the use of a curved mirror the size of the spot illuminated may be varied by varying the distance between the mirror and the subject, and the boundaries may be made quite gradual, by suitable selection of the mirror curvature, thus contributing advantageously to the photographic effects obtainable.

In case it is desired to obtain a certain degree of diffusion in the reflected light used for secondary illumination, this may be done by providing a piece of gauze or screen of suitable mesh in position between the curved mirror and the subject, so that the reflected light is partially diffused in passing through said gauze or screen.

In view of the above, one of the particular objects of the present invention is to provide an improvement in the art of photography which makes possible the secondary illumination of photographic subjects, by reflecting light from a primary source of illumination onto the photographic subject in a divergent beam.

A further object of the invention is to provide a simple and easily portable device which may be used to obtain secondary illumination on a photographic subject by reflection of light derived from a primary source of illumination in a divergent beam.

A further object of the invention is to provide means for obtaining secondary illumination by reflected light, of such character that the intensity and area of secondary illumination may be easily varied to produce the desired effect, either by varying the distance of the reflector from the subject or by using reflectors of different curvatures.

A further object of the invention is to provide a means for obtaining a "super-illumination" of a portion of a photographic subject, by reflecting light from a source of primary illumination onto a restricted portion of such subject in a divergent beam.

Further objects of the invention will be specifically pointed out in the following description or will be apparent therefrom.

The secondary illumination device of the present invention may comprise, in its simplest form, a non-planar mirror of high optical quality and high reflecting power, provided with suitable mounting means whereby said mirror may be positioned at any suitable angle and distance with respect to the subject to be illuminated, and adapted to receive light from a primary light source and reflect the same in a divergent beam onto said subject. The device may comprise a suitable support means adapted to receive a curved mirror, such as a convex or concave mirror, of glass, polished metal, or other material, and may advantageously comprise a holder means within which any one of a plurality of mirrors of different focal length may be installed.

Certain embodiments of the device which may be used according to the present invention are shown in the accompanying drawings, and referring thereto:

Fig. 1 is a perspective view of a form of the device, showing the same clamped to a suitable supporting structure;

Fig. 2 is a sectional detail thereof;

Fig. 3 is a partly sectional view thereof taken on line 3—3 therein;

Fig. 4 is a front view of a modified form of the reflector holding means according to the present invention;

Fig. 5 is a sectional view thereof taken on line 5—5 in Fig. 4;

Fig. 6 is a front elevation of a form of device adapted to position a plurality of reflecting elements;

Fig. 7 is a side elevation of the device shown in Fig. 6;

Fig. 8 is a schematic representation of the use of a reflecting means according to the present invention, providing secondary illumination for a photographic subject;

Fig. 8a is a view corresponding to Fig. 8, showing a single mirror used for illuminating a portion of the photographic subject;

Fig. 9 is a view corresponding to Fig. 8, showing a plurality of reflecting devices used to obtain secondary illumination from separate angles and at different intensities;

Fig. 10 is a view corresponding to Figs. 8 and 9 showing the use of a reflecting means according to the present invention cooperating with a source of primary illumination whereby the primary source if utilized to illuminate the rearward side of a photographic subject and the secondary illuminating means is utilized to illuminate the forward side of said subject;

Fig. 11 is a diagrammatic sketch showing the comparative reflection obtained with convex and concave mirrors;

Referring particularly to Figs. 1 to 3, the curved reflector 1, which is shown as being a convex mirror of silvered glass, polished metal or the like, is mounted in a holder 2 provided with a bracket 3 preferably adjacent one edge of the mirror as shown in Fig. 3, within which is mounted a ball 4 having an arm 5 secured to a spring clamp 6, said clamp 6 being provided with clamp members 7 and 8 adapted for engagement with a suitable supporting structure 9. The spring clamp 6 may be secured to any desired relatively fixed element such as a chair, post, tree branch, or the like, and, due to the universal adjustment obtainable through the mounting of the ball 4, the mirror 1 may be positioned at any suitable angle to obtain reflection in the desired direction upon the subject to be illuminated. The universal mounting means, such as shown at 3 and 4, is preferably disposed eccentrically with respect to the mirror, so as to permit a considerable adjustment in the position of the mirror with respect to the supporting means.

In Figs. 4 and 5 I have shown a curved mirror 11 mounted in a holder 12 in such manner as to be easily removable to provide for substitution of mirrors of different focal length or different radius of curvature, such as indicated by dot-dash lines in Fig. 5 at 11a and 11b. The mirror may comprise a silvered glass mirror, or, preferably, a suitably curved highly polished stainless steel mirror. The mirror may be disposed on a suitable ledge 13 within the holder 12 and said holder may be provided with suitable lugs 14 spaced about the inner periphery of the holder at one side and a movable latch member 15 at the other side of said holder, whereby said mirror may be removed from the holder upon occasion and a different mirror substituted therefor. The latch member 15 may conveniently comprise a metal strip pivotally mounted as at 15a on the member 12 and adapted to be swung to one side to permit one side of the mirror to be lifted from the ledge 13. This arrangement provides for securing any one of a plurality of mirrors within the holder 12, and these mirrors may comprise convex mirrors of differing focal length as shown at 11 and 11a, or may comprise concave mirrors such as indicated at 11b. The holder 12 may be provided with a suitable bracket 16 adapted to engage a universal ball 17 after the manner of the engagement of the bracket 3 with the ball 4 above-described, and the ball 17 may be suitably secured to supporting means such as the spring clamp 6 shown in Fig. 1.

The form of the device shown in Figs. 6 and 7 merely comprises a supporting structure 18 universally mounted as at 19 on a stem 21 slidably mounted in a tube 22 provided with a foot portion 23, whereby the supporting structure 18 may be raised or lowered with respect to the floor level and positioned at any desired elevation by means of a set screw or the like 24. The structure 18 is adapted to carry a plurality of mirrors 25, corresponding to the mirrors 1 or 11 above-described, pivotally and eccentrically mounted as at 26 on said structure 18. The proportions of the mirrors 25 and the frame 18 are preferably such that said elements, due to their eccentric mounting, may be swung inwardly to some such position as shown in dot-dash lines at 27 so that the several mirrors may be concentrated in a relatively small group, or may be swung outwardly as to be separated from one another as shown in full lines.

Referring to Fig. 8, a photographic subject is indicated at 31 and a camera at 32. The primary source of illumination may in this case comprise the sun and the rays of sunlight are indicated by the solid arrows S at the left and the left side of the subject is directly illuminated by said rays, as shown at S. According to the present invention, a highly reflective curved mirror $m$, such as above described, having a curvature indicated by the dotted line 33, the center of curvature being indicated at 34, may be positioned to the right of the camera and photographic subject in position to receive the sun's rays indicated by $S_2$ and reflect the same through a divergent angle R indicated by the dotted arrows 35 and 36. Thus the subject 31 is illuminated primarily by the sun's rays $S_1$, and secondarily by the divergent beam R, said divergent beam being directed on the subject 31 at an angle to the primary illumination and thus adapted to illuminate the shadows caused by the primary illumination. It will be seen that the selection of the curvature of the mirror will control the angle of divergence of the beam R and enable quite uniform secondary illumination to be obtained over a much larger area than would be possible were the mirror formed as a plane mirror. If a plane mirror of the same size as that of the curved mirror were employed, the area of illumination obtained thereby would be approximately as indicated by dot-dash lines P, which would not serve to provide the desired general illumination of the entire subject. It is appreciated that if a plane mirror were sufficiently large, illumination of any desired subject could be obtained, but if the size of the plane mirror were increased to cover any such area as could be covered by the divergent beam R, such a mirror would no longer be readily portable and the adaptability thereof to the present use would be very much lessened.

Fig. 8a shows the use of a secondary source of illumination to provide an accentuated illumination or "super-illumination" of a portion of the photographic subject. Referring to this figure, the subject 31a is shown as illuminated by the rays $S_1$, which may be derived from a suitable source of primary illumination such as shown at S in Fig. 8, and the secondary illumination is provided by a mirror $m_1$ positioned to reflect a light beam $S_2$ onto the subject 31a in a divergent beam $R_1$, this divergent beam being indicated by the dotted arrows 35a and 36a. In order that the spot of secondary illumination provided in this manner be such that the outer edges thereof gradually diminish in intensity whereby no sharp line is observable at the boundaries of such spot, the mirror $m_1$ is preferably provided with a compound curved surface. For example, the center portion $m_2$ of said mirror may be of relatively slight curvature, as indicated by the dotted line 33a, and the outer or marginal portion $m_3$ of the mirror may be of a greater curvature, such as indicated by the dotted lines 33b. With this construction the beam $R_1$ may be made up of a central cone designated at $R_2$ reflected from the mirror portion $m_2$, and of relatively great intensity, and an outer hollow cone designated at $R_3$, which gradually decreases in intensity from the inner cone $R_2$ to the boundaries designated at 35a and 36a. It will be appreciated that the marginal mirror portions $m_3$ may be made of gradually increasing curvature so that a uniform decrease in intensity of the illuminated area is obtained from adjacent the limits of the central cone $R_2$ to the outer margins of the hollow cone $R_3$. If desired, a gauze or screen may be placed between the marginal portions of the mirror and the subject 31a so as to obtain a greater diffusion of the marginal portions of the illuminated area, in the manner above suggested, instead of employing a mirror having its marginal portions of greater curvature than its central portion, or, such a screen may be used in conjunction with a mirror of the type shown at $m_1$. If it is desired to illuminate a greater or smaller area of the subject 31a, the mirror $m^1$ may be moved the required distance rearwardly or forwardly with respect to said subject.

In Fig. 9 the subject 31 is illuminated as above-described with direct light from S, as shown at $S_1$, and with a divergent beam R reflected from a mirror $m$, which is shown as having the same radius of curvature as the mirror $m$ in Fig. 8, and is also illuminated by a divergent beam R', indicated by the dotted arrows 37 and 38, reflected from a curved mirror $m'$ having a greater radius of curvature than the first-mentioned mirror so as to produce a reflected beam of less divergence and greater intensity, the curvature of said mirror $m'$ being roughly indicated by the dotted line 39 and the center of curvature at 41. Thus the rays $S_1$ illuminate the left-hand side of the subject 31, and the right-hand side of the subject is illuminated by the rays $S_2$ by reflection through the divergent beam R, and by the rays $S_3$ by reflection through the divergent beam R', and said subject may thus be provided with a double secondary illumination so arranged by the photographer as to obtain the desired lighting effect. In the particular arrangement shown, as compared with Fig. 8, the beam R is the same in both figures, but in Fig. 9, the mirror is placed further away from the subject and a less intense illumination obtained. Thus, there is provided a relatively strong secondary illumination on the rearward side of the subject by the beam R' (which is disposed at an angle in excess of 90° with respect to the camera) and a less strong secondary illumination for the front or camera side of the subject away from the primary illumination.

In Fig. 10 I have shown the subject 31 illuminated from a rearward angle by a primary illuminator such as a lamp 42, as shown by the arrows $I_1$, and illuminated from a forward angle by a divergent beam R'', indicated by the dotted arrows 43 and 44 by reflection of the light beam $I_2$ from a curved mirror M' having, for example, a curvature defined by dotted line 39 and point 41 as described in connection with Fig. 9.

While sunlight has been shown as the source of primary illumination in Figs. 8, 8a and 9, and an artificial illuminator as the source in Fig. 10, it will be understood that either sunlight or artificial illumination may be used in the manner shown in any one of these figures. It will also be understood that numerous other arrangements may be employed, using either sunlight or artificial light as a source of primary illumination in combination with one or more suitably disposed curved mirrors of equal or different curvatures to provide the desired degree, character and direction of secondary illumination.

While the above description pertains particularly to the use of a convex mirror, it will be appreciated that, according to the laws of optics, a concave mirror will function exactly as does a convex mirror of the same radius of curvature as far as the intensity and angle of divergence of the reflected beam is concerned. Some difference will exist between a convex and concave mirror in regard to the position of the apparent focal point thereof, such point being generally disposed rearwardly of a convex mirror and forwardly of a concave mirror.

Referring to Fig. 11, a convex mirror is shown at M and a concave mirror is shown at M'. Both of these mirrors are shown as spherical mirrors subtending an angle of 30° and of equivalent focal length. If a beam of light indicated by solid lines L strikes the mirror M at an angle of say 20° to the normal, the reflected beam will extend through an angle defined by the dotted lines $r$ and indicated by arc $Cv$ which places the apparent focus of the mirror M at a point F which is to the rear of the mirror and located downwardly from the axis thereof. A beam L' striking the concave mirror M' at the same angle of incidence to the normal, will be reflected through an angle defined by the dotted lines $r'$ and designated by the arc $Cc$, which places the apparent focus of the mirror at a point F' located forwardly of the mirror and above the axis thereof. The divergent reflected beams are quite comparable to one another as to angle of divergence, intensity, et cetera, but it will be seen that while the direction of propagation of the beam from the mirror is the same in both cases, the beams apparently originate from different points. This difference merely requires that the mirror be positioned at a slightly different location with respect to the subject in the two cases, in order to attain equivalent illumination. Thus, in the present specification and in the appended claims, the expression "curved mirror" will be taken to mean either a convex or concave mirror. It is also apparent that the curved mirror of the present invention is not necessarily one having a truly spherical curvature inasmuch as it may be of any desired non-planar surface configuration such as cylindrical, hyperboloidal, ellipsoidal, or the like, combinations of such surfaces, without departing from the spirit of this invention. For example, for certain purposes, it may be desirable to use a mirror having a compound curvature, or a mirror having one curvature in one plane and a different curvature in another plane so that the shape of the area illuminated thereby, as well as the relative intensity of illumination of various portions of such area may be controlled.

I claim:

1. In the art of photography, a secondary illuminating means for use in combination with a photographic subject and with a source of primary illumination positioned to illuminate said subject from one direction, comprising: a mirror positioned to receive light from said source of primary illumination and reflect the same upon said subject in a direction other than said one direction, said mirror having a curved highly reflecting surface of such configuration as to produce a divergent reflected light beam at the position of said subject.

2. The invention set forth in claim 1, said mirror comprising a convex highly reflecting surface.

3. In the art of photography, a secondary illuminating means for use in combination with a photographic subject and with a source of primary illumination positioned to illuminate certain portions of said subject to produce a highlighted and shadowed illumination thereof, comprising: a mirror positioned to receive light from said source of primary illumination and reflect the same upon said subject to illuminate the shadowed portions thereof, said mirror having a curved highly reflecting surface of such configuration as to produce a divergent reflected light beam at the position of said subject.

4. A method of illuminating a photographic subject which comprises: illuminating said subject with a source of primary illumination in one direction; and directing a beam of divergent light on said subject in a direction different from said first-named direction by reflection, from a highly reflecting curved mirror, of light derived from said primary source of illumination.

5. A method of illuminating a photographic subject which comprises; illuminating said subject with a source of primary illumination in one direction; directing a divergent light beam of a certain intensity and divergency on said subject in a direction different from said first-named direction by reflection of light from said primary source of illumination from a highly reflecting surface having a certain curvature; and directing another divergent light beam of intensity and divergency differing from said certain intensity and divergency in a direction substantially the same as said second-named direction by reflection of light from said primary source of illumination from a highly reflecting surface having a curvature different from the curvature of said first-named reflecting surface.

6. A method of illuminating a photographic subject which comprises: illuminating a subject in one direction by means of light from a primary source of illumination; directing a divergent light beam on said subject by reflection of light derived from said primary source of illumination by means of a curved mirror; and directing another divergent beam on said subject in a direction differing from said above-mentioned directions by reflecting additional light from said primary source of illumination by means of a second curved mirror, the divergence of said last-named divergent light beam being different from the divergence of said first-named divergent light beam.

7. A method of illuminating a photographic subject which comprises: illuminating certain portions of said subject with a source of primary illumination to produce a high-lighted and shadowed illumination thereof; and directing a divergent light beam on said subject to illuminate the shadowed portions thereof by reflection from a highly reflecting curved mirror of light derived from said primary source of illumination.

8. In the art of photography, a secondary illuminating means for use in combination with a photographic subject and with a source of primary illumination positioned to illuminate said subject from one direction, comprising: a plurality of mirrors positioned to receive light from said source of primary illumination and reflect the same upon said subject in a plurality of different directions other than said one direction, each of said mirrors having a curved highly reflecting surface of such configuration as to produce a divergent reflected light beam at the position of said subject.

9. The invention set forth in claim 8, each of said mirrors comprising a convex highly reflecting surface.

10. In the art of photography, a secondary illuminating means for use in combination with a photographic subject and with a source of primary illumination positioned to illuminate said subject from one direction, comprising: a plurality of mirrors positioned to receive light from said source of primary illumination and reflect the same upon said subject in a plurality of different directions and at different intensities, each of said mirrors having a curved highly reflecting surface of such configuration as to produce a divergent reflected light beam at the position of said subject.

11. The invention set forth in claim 10, said mirrors having curved reflecting surfaces of different configuration whereby the light beams reflected therefrom are of different degrees of divergence.

DONALD W. NORWOOD.